Figure 1:
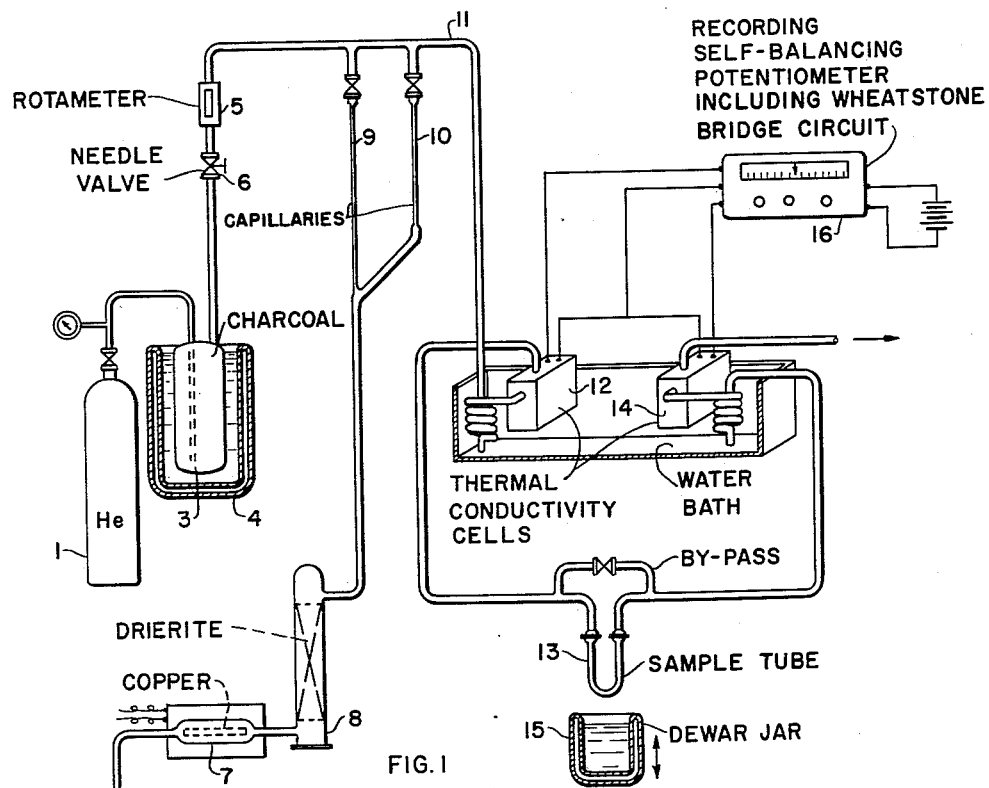

Nov. 22, 1960  F. M. NELSEN ET AL  2,960,870
METHOD AND APPARATUS FOR DETERMINATION OF SURFACE AREAS
Filed Feb. 25, 1957

INVENTORS:
FRED M. NELSEN
FRANK T. EGGERTSEN,
BY John H. Colvin
THEIR ATTORNEY

United States Patent Office 2,960,870
Patented Nov. 22, 1960

2,960,870

METHOD AND APPARATUS FOR DETERMINATION OF SURFACE AREAS

Fred M. Nelsen and Frank T. Eggertsen, Orinda, Calif., assignors to Shell Oil Company, a corporation of Delaware Filed Feb. 25, 1957, Ser. No. 642,289

15 Claims. (Cl. 73—432)

This invention relates to a method and apparatus for the determination of the areas of surfaces.

Various methods have been used to determine the surface areas of solids. Most of these have been empirical in nature and satisfactory only for a rough estimate of the surface of a particular type of material. The so-called oil absorption number of pigments, the methods involving the adsorption of dyes or alkali and some methods involving heat of wetting are examples of prior methods.

The most commonly used method for determining surface areas is the method of S. Brunauer, P. H. Emmett and E. Teller described in J. Am. Chem. Soc. 60, 309 (1938). This method which is commonly referred to as the BET method involves determination of the adsorption isotherm of nitrogen on the outgassed sample at different partial pressures of nitrogen and then calculating the amount of adsorbed nitrogen corresponding to a monolayer on the surface. This method requires a costly vacuum system as well as costly and delicate apparatus for the very accurate measurement of pressure differences. The calculations are involved. There is no visual record of the determination. The method, while capable of giving excellent results is time-consuming and requires a highly skilled operator. No apparatus suitable for the determination of surface areas by this method is fabricated and offered for sale as a standard piece of laboratory equipment. Application of the method is therefore restricted to the few universities and research laboratories which have had special equipment made for them.

The BET method has been improved by the U.S. Bureau of Standards. (See W. V. Loebenstein and V. R. Dietz, J). Research Natl. Bur. Standards, vol. 46, No. 1, pp. 51–53 (1951). Fundamentally, the method as developed by the Bureau of Standards consists in securing the desired partial pressure of nitrogen through dilution with helium rather than by the application of sub-atmospheric pressures. This simplifies the outgassing of the sample and allows operation at near atmospheric pressure. The amount of nitrogen required to afford the desired partial pressure of nitrogen after equilibrium with the sample is first estimated. This amount is combined with the helium and the nitrogen adsorption is measured after equilibrium. The attainment of equilibrium requires lengthy contact with the gas mixture. Also, the method depends upon determining the differences between two relatively large gas volumes and therefore requires very accurate measurements. The calculations are essentially identical to those required in the BET method. The method is also time-consuming and requires a highly skilled operator. Apparatus for the determination of surface areas by this method is likewise not available commercially and the method is therefore of limited application.

The object of the present invention is to provide a method for the determination of surface areas which is much faster and may be carried out by relatively unskilled operators in a routine manner. A further object of the invention is to provide a method which is both accurate and applicable over a wide range of surface areas. A further object of the invention is to provide a method in which the calculations involved are exceedingly simple or may be entirely eliminated and in which a visual record of the determination may be obtained. A further object of the invention is to provide an apparatus for the determination of surface areas which is much less costly than those required for the BET method and for the Bureau of Standards modification thereof, does not require vacuum equipment, and is suitable for manufacture and sale as a standard piece of laboratory equipment.

In general outline the invention comprises continuously passing a constant stream of a gaseous mixture of known composition consisting of an adsorbate and an inert diluent through a measured sample of the material on a once-through basis at a temperature at which neither the inert diluent nor the adsorbate is appreciably adsorbed by the sample; the sample is then cooled to a temperature at which adsorption of the adsorbate selectively takes place and the amount of adsorbate in the effluent stream from the sample is continuously measured during the cooling. The thus determined amount of adsorbate adsorbed by the sample is a measure of its surface available to the adsorbate.

In a preferred more specific application a stream of a known constant mixture of nitrogen and helium is passed continuously on a once-through basis at essentially room temperature and atmospheric pressure through a sample tube containing a weighed sample of the material whose surface is to be measured while obtaining an indication of the steady state concentration of nitrogen in the mixture leaving the sample tube. With the gas flow constant the sample tube is cooled to the temperature of liquid oxygen or liquid nitrogen and the amount of nitrogen absorbed from the flowing gas mixture is measured by measuring the nitrogen content in the effluent from the sample tube until this content returns to its original value thus showing that the gas mixture is in equilibrium with the sample at the low temperature in question. In a still further preferred embodiment the sample tube is again returned to the initial temperature while maintaining the gas flow constant while measuring the concentration of nitrogen in the effluent stream from the sample tube until the nitrogen concentration again returns to the initial value. The continuously measured differences between the nitrogen content of the original mixture and the effluent from the sample tube during the adsorption (cooling) and/or desorption (rewarming), when integrated over the periods of time to reach equilibrium at the constant gas rate employed, is a direct measure of the nitrogen adsorbed and/or desorbed which amount of nitrogen is a function of the surface area of the sample.

In the preferred method the concentration of nitrogen in the effluent stream from the sample is continuously determined during the adsorption and/or desorption periods by passing the gas stream through a thermal conductivity cell (katharometer) which is coupled in known manner with a recording instrument such as a recording potentiometer or milliammeter. When the effluent gas mixture from the sample tube is continuously analyzed by such an arrangement the pen of the recording instrument at first scribes a straight line the level of which corresponds to the nitrogen content of the mixture being employed.

As soon as the sample is cooled, for example by immersing the sample tube in a Dewar flask containing liquid nitrogen, the pin of the recording instrument describes a distinct blip and then returns to a straight line showing that equilibrium between the gas and the sample has been established at liquid nitrogen temperature. Equilibrium is established in a very short time, e.g. 3 minutes. If, after this equilibrium has been established, the source of cooling of the sample is removed thereby allowing the sample to return to the starting (initial) temperature, the pen of the recording instrument describes a second blip in opposite direction and after a short period returns again to a straight line at the original level.

The area on the graph thus produced under the first blip and more accurately that under the second blip is found to be directly proportional to the surface area of the sample. This area under the blip may be read off from the graph with a planimeter, by estimating squares, by cutting out and weighing, or an integrating recording instrument may be used which gives the area directly.

In the above description of the specific application the process has been described as applied for the determination of surface areas of solids through the use of nitrogen as the adsorbate. The area determined is that which is available to nitrogen and may be called the "nitrogen surface area." This is considered to be the true surface area. However, it is not the surface area that one may wish to determine. For example, many micro-porous catalysts may have an appreciable part of their surface in pores which are so small as to be inaccessible to the reactant or reactants to be catalyzed. It is desired therefore in many cases to know the surface area of the solid available to molecules of larger size than nitrogen, such, for example, as $H_2S$, HCN, NO, $CO_2$, methane, butane, cyclohexane or the like. The present method lends itself to the determination of the surface available to such larger molecules.

In these cases the appropriate material such as one of those listed above is chosen as the adsorbate. The adsorbate must, of course, be one which does not react chemically with the solid to be measured or any part of the apparatus and it must be stable at the temperatures employed. This material is then diluted with helium or another suitable inert diluent. The diluent may be any chemically inert material which will not adsorb to any appreciable extent on the surface at the lowest temperature used in the determination. For any given adsorbate it is recommended to choose a diluent having a critical temperature below, and more preferably at least 40° C. below, the boiling point of the adsorbate. A few of the possible materials which may be used as adsorbates and/or diluents with their approximate critical temperatures and boiling points are given below.

| | Critical Temperature, ° C. | Boiling Point ° C. |
|---|---|---|
| Butane | 153 | 0 |
| $N_2O$ | 36 | −89 |
| Ethane | 32 | −88 |
| $CO_2$ | 31 | −78 |
| Xe | 17 | −107 |
| Ethylene | 10 | −104 |
| Kr | −63 | −153 |
| Methane | −82 | −161 |
| NO | −94 | −152 |
| $O_2$ | −119 | −183 |
| A | −122 | −185 |
| CO | −139 | −192 |
| $N_2$ | −147 | −196 |
| Ne | −228 | −246 |
| $H_2$ | −240 | −252 |
| He | −268 | −268 |

It will be evident from the above table that such materials as helium and hydrogen may be used as diluents for any of the other materials from nitrogen up, whereas nitrogen and carbon monoxide, for example, are suitable as diluents only for materials much higher up in the scale as for example ethylene, carbon dioxide and the like. Helium and hydrogen are the practical diluents for nitrogen as adsorbate; nitrogen and carbon monoxide are quite practical for most hydrocarbon adsorbates.

The initial temperature of the sample prior to the cooling step may be chosen over a very wide range of, for example, −30° C. to 500° C. It is only essential that the temperature chosen be above that at which capillary condensation or appreciable adsorption of adsorbable species (adsorbate e.g. nitrogen) takes place. In the case of nitrogen, this may be any temperature above about −30° C. In the case of adsorbates which are more easily condensed or adsorbed than nitrogen, this minimum temperature is correspondingly higher.

The initial temperature is normally retained substantially constant and when using nitrogen as the adsorbate it is normally at about room temperature. Variations in this temperature of several degrees between different determinations introduce no appreciable error unless the temperature of the thermal conductivity cell which is, of course, temperature sensitive, is allowed to vary appreciably. This is no problem, however, since the thermal conductivity cell is normally immersed in a constant temperature bath which is held at any convenient and suitable constant temperature.

The absolute pressure in the sample tube during the determination is not critical. It may be chosen over a range of several atmospheres, depending upon the gas mixture used, but should be maintained substantially constant from one determination to the next. The slight positive pressure required to force the gas through the apparatus is most practical and quite suitable regardless of whether the determination is made at sea level or at an elevated station.

The temperature to which the sample is cooled in the cooling step may likewise be chosen over a broad range of from about the temperature of liquid nitrogen (about −196° C.) to, for instance, 200° C. depending upon the gas mixture used. When calibrating, as will be explained later, against a sample of known surface area this temperature must be held quite constant, e.g. within 0.5 to 2° C. depending upon the adsorbate. When the calibration is by means of a known quantity of the adsorbate it is not essential to maintain the temperature constant but the temperature for each determination must be accurately known. Thus, for example, when using liquid nitrogen for cooling, it is the practice to measure the temperature of each batch used so as to be able to correct for the temperature differences due to dissolved oxygen.

The concentration of the adsorbate in the inert gas may likewise range over a wide range from a fraction of a percent up to about 99% by volume, these upper and lower limits being set only by the sensitivity of the detector and recording instruments. However, as a matter of practice, it is desirable to operate in the region of low concentration of the adsorbate of the order of 2 to 60 percent by volume since low concentrations afford the most accuracy.

While the absolute pressure, the temperature to which the sample is cooled, and the concentration of adsorbate in the gas mixture may each be chosen over a wide range, as indicated above, it is essential for the determination of surface area that these factors be chosen such that the relative pressure of the adsorbate at the cooled temperature is below about 0.35 and preferably between about 0.05 and 0.25 and most preferably at 0.10±0.05. Relative pressure, as understood in this field, is the ratio between the pressure in question and the saturation pressure at the temperature employed. The saturation pressure is the vapor pressure of the bulk liquid at equilibrium at the temperature in question.

As stated above, a preferred means for continuously measuring the concentration of adsorbate in the gas stream issuing from the sample is through the use of a thermal conductivity cell. Thermal conductivity cells of either the hot wire or thermistor type may be used. These detecting instruments and their use with recording instruments are well known and applied for the continuous analysis of gas streams of varying compositions in gas chromatography. The invention is however not limited to the use of this particular method of analysis of the gas stream. Thus, for example, a gas density balance may be used (see Chemical and Engineering News, December 3, 1956, page 5992). Likewise, a vibrating reed electrometer or a beta ray gauge may be used. In the case where the adsorbate is combustible the gaseous effluent from the sample tube may be burned in a small jet while measuring fluctuations in the flame temperature.

While one detecting device, e.g. a thermal conductivity cell, in the line following the sample tube can be used as described, it is advantageous to use two such detecting devices. Thus, a reference cell may be placed in front of the sample tube. The use of two such cells increases the accuracy since the differences between the reference cell and the final cell is measured and any minor variations due to changes in the flow rate or other factors are largely compensated.

The electrical out-puts from the above-mentioned detecting devices or methods may be measured and recorded by a number of instruments already used for this purpose. For example, a recording milliammeter is suitable. In those cases where change in electrical resistance of an element in the detecting cell is sensed, a recording potentiometer is well suited.

In the preferred method used for routine analyses a sample of material of known surface area is tested and the area under the blip determined. The surface areas of other known samples may then be quickly and easily determined since the areas under the blips are directly proportional to the surface areas. The whole operation may be carried out in a few minutes.

It is not essential, however, to rely upon a calibration against a solid of known surface area although this is the most practical and convenient method to use and is entirely satisfactory. If desired, surface areas may be determined without a reference sample in the following manners. The area under the blip obtained upon injecting a known quantity of adsorbate in the absence of a sample is determined. Thus the detecting cell and recording instrument are calibrated with the known quantity of adsorbate in which case the area under the blip is a direct measure of the adsorbate. According to the first method the temperature to which the sample will be cooled is accurately determined, e.g. the boiling point of pure nitrogen at the prevailing atmospheric pressure, and then a mixture of the adsorbate and diluent is used in which the partial pressure of adsorbate at that temperature is calculated to form a monolayer on the sample, e.g. 0.08 relative pressure, i.e. 0.08 times the saturation pressure. This method gives directly the surface area of the sample without respect to any reference sample. It is sometimes not as accurate as through the use of a reference sample due to the fact that, while the relative pressure corresponding to a monolayer can be fairly accurately estimated, this pressure does vary between solids having different surface characteristics and if the relative pressure is incorrectly estimated the determined area will be somewhat in error. In most cases, however, when dealing with essentially similar materials, e.g. silica-alumina cracking catalysts, the relative pressure corresponding to a monolayer is quite accurately known and consequently the results obtained by this simple method are quite accurate.

An accurate determination of the surface area may be made while avoiding the above-mentioned uncertainty by making three separate determinations on the sample using three different partial pressures of adsorbate within the range of 0.05 to 0.35 relative pressure and then from the determined qauntities calculating the surface area in the same manner as in the so-called three-point method commonly used to calculate the surface area using the well-known BET method. This method involving three separate determinations and rather extensive calculations is more time-consuming.

It is essential in the present method that the helium and nitrogen or other gas used to measure the surface area be substantially free of impurities which are strongly adsorbed by the material being measured. Since the present method is one in which a constant gas flow is used on a once-through basis, as contrasted to systems wherein a given amount of gas is recycled through the sample, such strongly adsorbed impurities tend to accumulate on the sample and lower the determined area. If insufficiently pure gases are used successive determinations on the same sample (by simply cooling again and bringing the sample back to the initial temperature a second time) show a decreased value for the surface area. The helium and nitrogen may be easily purified by known methods if found to be contaminated. Thus, for example, the nitrogen may be passed over heated copper and then through a drying agent such as "Drierite" (calcium-sulfate) and the helium may be passed through activated charcoal at liquid air temperature. Such separate treatments of the gases are usually unnecessary however. It is found in practice that when using nitrogen and helium of normal purity the danger of erroneous results due to contamination may usually be avoided by simply passing the gas mixture through a cold trap filled with glass wool and immersed in liquid nitrogen.

Figure 2:
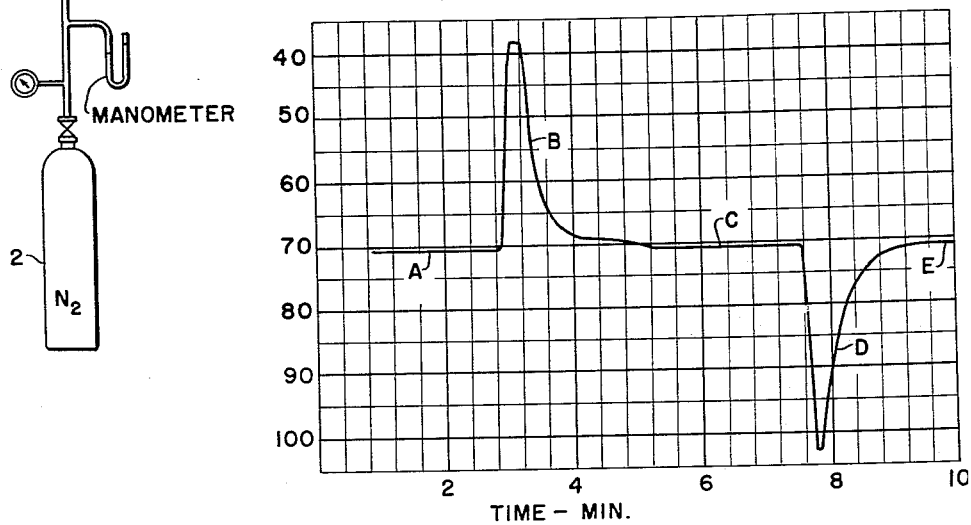

The method of the invention as well as a suitable apparatus will be further described with reference to the accompanying drawing. Figure 1 of the drawing shows the arrangement of the parts of one suitable apparatus, the parts being shown diagrammatically. The various lines shown are normally mainly glass tubing with rubber or plastic tubing for certain of the connections and where flexibility is desired. Figure 2 of the drawing shows the trace made by the recording potentiometer during a typical determination.

Referring to Figure 1, the apparatus comprises a source of helium 1 and a source of nitrogen 2. The helium is passed through the tower of charcoal 3, cooled by liquid air in the Dewar flask 4 and through a flow measuring device 5 (such as a rotameter). The flow is regulated by a fine needle valve 6 to the desired flow rate which in a typical case may be about 45 cc. per minute. The nitrogen under a small pressure, e.g. 2 p.s.i.g., is passed over copper in the heated tube 7 and then through a tower of Drierite 8. The nitrogen is then passed through one or more of the capillary tubes 9, 10 which are manifolded and provided with suitable stop cocks such that the nitrogen may be passed through either one of the tubes alone or through both tubes together. The capillaries are of different size and/or length so that their individual flows differ. With this arrangement any one of three different flow rates of nitrogen may be instantly and accurately established. Other types of fixed orifice flow regulators may be used, or, if desired, a precision regulating valve with a precision flowmeter may be substituted. If desired, more than two such capillary tubes may be combined in the manifold, or for routine determinations a single capillary tube may suffice. For the above described three-point method of determining the surface area the orifice arrangement should be capable of accurately establishing three separate nitrogen flow rates. Adjustment of the nitrogen partial pressure in the gas mixture can also be made by varying the flow rate of helium. However, this is less desirable.

The nitrogen and helium streams are combined and passed by line 11 through a first thermal conductivity cell 12 (reference cell) then through the sample in sample tube 13 and then through a second thermal conductivity cell 14.

The two thermal conductivity cells are part of a bridge circuit whose output is recorded on a recording self-balancing potentiomter 16. With the gas mixture being passed through both cells the bridge is adjusted so that the recorder traces a zero or rear zero input signal. When the sample is cooled or heated the change in the composition in the second or measuring cell causes a change in the wire temperature which is proportional to the concentration of nitrogen. This change is temperature results in an unbalance of the bridge which is recorded by the potentiometer over a period of time as a peak. When the adsorption or desorption is completed the wire returns to its original temperature and the recorder returns to the original base line.

The sample in the case illustrated is held in a glass U tube having ground tapered connecting joints. The desired and weighed amount of sample of the material whose area is to be determined is placed in the U tube. Prior to charging the sample to the tube it is preferably dried to remove moisture or other normally liquid material that might appreciably alter the weight of the sample upon subsequently outgassing. The tube with the weighed sample is then outgassed. In the BET method for determining surface area this requires long heating of the sample under very high vacuum. In the present method a vacuum may be used but is not necessary. The tube may be simply heated while helium is passed through it until volatile material adsorbed on the sample has been removed. If desired, the preliminary drying of the sample prior to charging to the tube may be dispensed with. The sample may ve charged to the tared tube and the weight of the true sample obtained by weight difference after outgassing. The tube with the outgassed sample is then connected into the train as illustrated.

In the case of the determination of surface areas by nitrogen the temperature of the sample in the tube is essentially around room temperature and the particular temperature is not critical. Upon passing the mixture of nitrogen and helium through the train set-up as described, the pen of the recording potentiometer 16 quickly comes to a state herein called the base line illustrated in the line section A of the graph shown in Figure 2. It is not essential that the level of this base line be established at this point since, as discussed above, it is preferable to use the area under the desorption blip or peak rather than that under the first blip. Thus the sample may be immediately cooled. However, since the base line is established very quickly and since the information gained therefrom affords an additional check against errors due to impurities in the gas stream it is recommended to allow this base line to be established before cooling the sample.

In either case the sample is then cooled. In the case illustrated this is effected by raising the Dewar flask 15 containing liquid nitrogen. The recording potentiometer immediately records a blip such as illustrated by the line section B in the graph shown in Figure 2. If the base line was established prior to the cooling, the area under this blip is proportional to the surface area of the sample. Following this first blip the recording potentiometer quickly returns to the base line establishing a second flat portion such as illustrated in the segment C of the graph shown in Figure 2. This line segment shows that the sample is at equilibrium with the gas mixture at the new temperature. At any time after the flat C appears the sample is brought back to the original temperature as by removing the liquid nitrogen bath. The recording potentiometer thereupon immediately records a second or desorption blip in opposite direction to the first and then returns to the base line. This desorption blip or peak is illustrated in the line segment D in the graph shown in Figure 2 and the re-established base line showing that equilibrium is again established is shown by the line segment E.

The area under the desorption blip may be measured by any known method or as pointed out above, an integrating recorder may be used which supplies the answer directly and numerically in convenient units.

While it is not essential, it is desirable to provide the apparatus with a line having a suitable valve which by-passes the sample tube. After the sample has been cooled by raising the Dewar jar, this by-pass line is opened to such an extent that only a part of the gas passes through the sample tube and the remaining part passes through the by-pass line. This prevents the sample on the up-stream side from being heated by the incoming gas and being thus prevented from attaining the temperature of the liquid nitrogen. If all of the sample is not cooled to the desired temperature the measured surface area will be too low. At about the time that the gas liberated in the desorption step reaches the thermal conductivity cell 14 this bypass line may be closed or throttled forcing more of the gas through the sample tube. This speeds up the desorption. Also, in this way errors due to change in gas flow rate are avoided since with the small flow rate through the sample cell during the desorption step the desorbed nitrogen does not reach the thermal conductivity cell until the surge in gas flow due to the thermal expansion of the gases is past.

EXAMPLES

In the following examples an apparatus hastily constructed of glass and plastic tubing was used. The apparatus was essentially as that illustrated in the drawing except for some minor details. The recording potentiometer used was manufactured by the Brown Instrument Division of the Minneapolis-Honeywell Regulator Company, Model Y 153 X 17 (V)–X–9 (A1) (D) P4 (V) range 0–1 to 0–30 mv. The fine pressure adjustment for the supplies of helium and nitrogen was effected with a Foxboro Supply Regulator type 67 RPE. The needle valve used to adjust the helium flow rate was a ⅛″ "Ideal sensitive needle valve" manufactured by the Ideal Laboratory Tool and Supply Company, Cheyenne, Wyoming. The valve in the by-pass line was a ⅛″ Hoke diaphragm type needle valve manufactured by Hoke Inc., Inglewood, New Jersey. The thermal conductivity cell blocks were of the convection-diffusion type (flow insensitive) equipped with ca 15 ohm sensing wires manufactured by Gow-Mac Instrument Company. The thermal conductivity cell arrangement is more fully described in Dimbat et al., Anal. Chem., 28, 290 (1956).

*Example I*

A 0.0625 gram sample of an activated alumina having a known surface area between 234 and 274 m.$^2$/g. (best estimate from several determinations=255 m.$^2$/g.) as determined by the usual three-point BET method, was outgassed by passing through it in the sample tube a stream of helium at a temperature of 150–500° C. for one hour. The sample tube was then placed in the apparatus and the gas flow was set at ca 52 cc. per min. The flow rates of nitrogen and helium were such that the gas mixture consisted of 23% nitrogen. At atmospheric pressure and liquid nitrogen temperature this corresponds to a relative pressure of 0.23. After bringing the sample to equilibrium with the gas mixture at the temperature of liquid nitrogen the sample was brought back to room temperature. The area under the desorption blip recorded by the potentiometer was 268 sq. cm. per gram of sample.

Using this as a calibration, samples of other materials of known surface areas were tested in the same manner with the results shown in the following Table I.

TABLE I

| Material | Weight of Sample, g. | Determined Surface Area | Surface Area by BET Method |
|---|---|---|---|
| Activated alumina | 0.0625 | (255) | 255 |
| Silica gel | 0.0540 | 326 | 330 |
| Equilibrium silica-alumina cracking catalyst | 0.1805 | 95 | 103 |
| Crushed diatomaceous earth fire brick | 0.9608 | 3.2 | 3.1 |

It will be noted that the agreement between the two methods is quite good despite the fact that the relative nitrogen pressure in these cases corresponded to something more than a monolayer and that the materials tested differed widely in properties.

Example II

With the sample tube empty a mixture of helium and nitrogen of approximately the same composition as in the above example was passed through the apparatus. To this gas stream known amounts of nitrogen, e.g. 5 cc., were added and the peak areas determined. This calibration showed that at a constant total gas flow rate of 50 cc. per min. the area under the peak recorded by the potentiometer was about 40 sq. cm. per cc. of nitrogen. Since 1 cc. of nitrogen corresponds to a surface area of approximately 4.40 sq. m. it is thus possible to determine the surface areas of various materials without reference to a sample of known area.

Example III

The surface areas of samples of widely varying materials were determined using the three-point method. In these determinations three relative pressures of nitrogen in the range of about 0.12 to 0.32 were used and the surface areas were then calculated from the resulting nitrogen desorption peaks in the same manner as when calculating surface areas by the three-point BET method. The results are shown in the following Table II.

| Material | Weight of Sample, g. | Measured Surface Areas m.$^2$/g. | Surface Area by BET method m.$^2$/g. |
|---|---|---|---|
| Crushed diatomaceous earth fire brick | 0.7526 | 3.5 | 3.1 |
| "Pelletex" (low area carbon) | 0.5601 | 23 | 24 |
| Silica-alumina equilibrium cracking catalyst | 0.2096 | 90 | 103 |
| Crushed pelletted alumina | 0.0759 | 259 | 237 |
| Silica-alumina cracking catalyst | 0.0672 | 424 | 438 |

We claim as our invention:

1. Method for determining the surface area of a material which comprises continuously passing a stream of a gaseous mixture of known and constant composition consisting of an adsorbate and an inert gaseous diluent in contact at a constant pressure with a measured sample of the material on a once-through basis at a temperature at which neither the inert diluent nor the adsorbate is appreciably adsorbed by the sample, then while continuing said stream, cooling the sample to a temperature at which adsorption of the adsorbate selectively takes place, continuously measuring the decrease in the concentration of the adsorbate in the stream down stream of the sample during said cooling and until equilibrium is re-established and integrating the measured decrease in concentration of the adsorbate over the period of cooling until said equilibrium is re-established.

2. Method for determining the surface area of a material which comprises continuously passing a stream of a gaseous mixture of known and constant composition consisting of an adsorbate and an inert gaseous diluent at constant rate into contact at a constant pressure with a measured sample of the material on a once-through basis at a temperature at which the adsorbate is selectively adsorbed by the sample, then while continuing said stream, heating the sample to a temperature at which neither the adsorbate nor diluent is appreciably adsorbed by the sample, continuously measuring the increase in the concentration of adsorbate in the stream after contacting said sample during said heating and until equilibrium is re-established and integrating the measured increase in concentration of the adsorbate over the period of heating until said equilibrium is re-established.

3. A process in accordance with claim 2 further characterized in that the measuring is by sensing and recording the difference in thermal conductivity of the gas stream due to the changed composition during said heating.

4. The method according to claim 2 further characterized in that the measuring is by sensing the differences in thermal conductivity of the gas stream and recording differences in flow of electricity through a conductor induced by differences in thermal conductivity of the gaseous mixture.

5. The method according to claim 2 further characterized in that the measuring is by sensing and recording the differences in the density of the gas stream due to the changed composition during the change from equilibrium at the first temperature to equilibrium at the second temperature.

6. The method according to claim 2 further characterized in that the relative pressure of the adsorbate in the gas mixture prior to contacting the sample is between about 0.05 and 0.35 at the first said temperature.

7. A process according to claim 2 further characterized in that the diluent is a gas selected from the group consisting of helium and hydrogen and the adsorbate is a gas having a normal boiling point at least 40° above the critical temperature of hydrogen.

8. The method according to claim 2 further characterized in that the adsorbate is a hydrocarbon and the diluent is a gas selected from a group consisting of hydrogen and helium.

9. A process according to claim 2 further characterized in that the adsorbate is nitrogen, the diluent is a gas selected from the group consisting of helium and hydrogen, the first said temperature is essentially the normal boiling point of nitrogen and the latter said temperature is approximately room temperature.

10. Apparatus suitable for the determination of surface areas of a sample material which comprises in combination and connected by suitable tubing in the order named, separate means for supplying a constant known stream of a first, diluent gas and means for supplying to said stream a constant known flow of a second, adsorbate gas to a common gas transfer line, a first thermal conductivity cell, a removable sample tube, and a second thermal conductivity cell, said apparatus having a valved by-pass line connected in parallel with said sample tube, a recording potentiometer electrically connected to a voltage source and said conductivity cells in a manner to record the difference in the current flow through the two cells, and means for bringing the said sample tube to two constant known widely spaced temperatures.

11. Method for the determination of surface areas which comprises forming a gaseous mixture of known and constant composition consisting of an adsorbate and an inert gaseous diluent, continuously passing said mixture at a known and constant rate as a confined gaseous stream at essentially atmospheric pressure, passing at least a fraction of said stream continuously on a once-through basis in contact with a sample of material the surface of which is to be measured at a temperature at which the adsorbate is selectively adsorbed by the sample and under a constant pressure, then while continuing said stream heating the sample to a temperature at which neither the adsorbate nor diluent is appreciably adsorbed by the sample, continuously measuring the increase in the relative proportion of adsorbate in the total gaseous stream down stream of said sample during said heating and until equilibrium between the said gas and the sample is established and the concentration of the adsorbate in the stream measured at this point equals that in the said gaseous mixture formed, and integrating the measured increase in concentration of the adsorbate over the period of heating until equilibrium is established.

12. Method for determining the surface area of a solid material which comprises continuously passing a stream of a gaseous mixture of known and constant composition consisting of an adsorbate and an inert gaseous diluent at a constant rate and at a constant pressure through a measured sample of the material on a once-through basis at a temperature at which the adsorbate is selectively adsorbed by the sample, then while continuing the passage of said stream heating the sample to a temperature at which neither the adsorbate nor diluent is appreciably adsorbed by the sample, continuously measuring the relative proportions of inert diluent and adsorbate in the gas stream up-stream and down-stream of the sample during said heating and until said relative proportions up-stream and down-stream of the sample are the same, and integrating the measured proportions of inert diluent and adsorbate over the period of heating until equilibrium is established.

13. Apparatus suitable for determination of surface areas of a sample material which comprises in combination and connected by suitable tubing in the order named, separate means for supplying a constant known stream of a first, diluent gas and means for supplying to said stream a constant known flow of a second, adsorbate gas to a common gas transfer line, a first thermal conductivity cell, a removable sample tube, and a second thermal conductivity cell, said apparatus having a recording potentiometer electrically connected to a voltage source and said conductivity cells in a manner to record the difference in the current flow through the two cells and means for bringing the said sample tube to two constant known widely spaced temperatures.

14. Apparatus suitable for the determination of surface areas of a sample material which comprises in combination and connected by suitable tubing in the order named, separate means for supplying a constant known stream of a first, diluent gas and means for supplying a constant known flow of a second, adsorbate gas to a common gas transfer line, a first sensing device capable of sensing the relative proportions of the said adsorbate and diluent gases at constant pressure, a removable sample tube, and a second sensing device similar to the first, said apparatus having a recording device electrically connected to a voltage source and said first and second sensing devices in a manner to record the difference in the signals produced by said first and second sensing devices, and means for bringing the said sample tube to two constant known widely spaced temperatures.

15. Apparatus suitable for the determination of surface areas of a sample material which comprises in combination and connected by suitable tubing in the order named, separate means for supplying a constant known stream of a first, diluent gas and means for supplying a constant known flow of a second, adsorbate gas to a common gas transfer line, a first sensing device capable of sensing the relative proportions of the said adsorbate and diluent gases at constant pressure, a removable sample tube, and a second sensing device similar to the first, said apparatus having a valved line connected in parallel with and by-passing said sample tube, a recording device electrically connected to a voltage source and said first and second sensing devices in a manner to record the difference in the signals produced by said first and second sensing devices, and means for bringing the said sample tube to two constant known widely spaced temperatures.

References Cited in the file of this patent

UNITED STATES PATENTS

| | | |
|---|---|---|
| 2,358,467 | Minter | Sept. 19, 1944 |
| 2,692,497 | Van Nordstrand | Oct. 26, 1954 |
| 2,729,969 | Innes | Jan. 10, 1956 |

OTHER REFERENCES

Publication: Bureau of Standards, Journal of Research, vol. 46, No. 1, pages 51–55, 1951.

Book: "Particle Size Determination," by Cadle, Interscience Publishers, New York, 1955, pages 251–259.